United States Patent [19]

Misukanis et al.

[11] Patent Number: 5,681,053
[45] Date of Patent: Oct. 28, 1997

[54] PROTECTIVE ENCASEMENT FOR TRAILER COUPLERS

[75] Inventors: Edward V. Misukanis; Michael E. Misukanis, both of Camarillo; Robert M. Thomas, Whitethorn, all of Calif.

[73] Assignee: Alpine Solutions Incorporated, Camarillo, Calif.

[21] Appl. No.: 454,559

[22] Filed: May 30, 1995

Related U.S. Application Data

[63] Continuation-in-part of Ser. No. 248,312, May 24, 1994, abandoned.

[51] Int. Cl.⁶ ................................................. B60D 1/60
[52] U.S. Cl. ............................................................ 280/507
[58] Field of Search ................................. 280/507, 511, 280/504; 70/254, 255, 258, 212, 211

[56] References Cited

U.S. PATENT DOCUMENTS

| | | | |
|---|---|---|---|
| 3,391,555 | 7/1968 | Mamo | 280/507 X |
| 3,605,457 | 9/1971 | Foster | 280/507 X |
| 3,924,878 | 12/1975 | Utman et al. | 280/507 |
| 4,141,569 | 2/1979 | Dilk | 280/507 |
| 4,648,618 | 3/1987 | Utman et al. | 280/507 |
| 4,730,841 | 3/1988 | Ponder | 280/507 |
| 4,774,823 | 10/1988 | Callison | 280/507 |
| 5,000,067 | 3/1991 | Kolbusz et al. | 280/507 X |
| 5,154,440 | 10/1992 | Dolan et al. | 280/507 |
| 5,195,339 | 3/1993 | Nee et al. | 280/507 |
| 5,219,435 | 6/1993 | Sprunger | 280/507 X |
| 5,222,755 | 6/1993 | O'Neal | 280/507 |

FOREIGN PATENT DOCUMENTS

| | | | |
|---|---|---|---|
| 2 458 410 | 2/1981 | France | 280/507 |
| 2 609 944 | 7/1988 | France | 280/507 |
| 35 02 701 | 7/1986 | Germany | 280/507 |
| 9000287 | 9/1991 | Netherlands | 280/507 |
| 2 218 391 | 11/1989 | United Kingdom | 280/507 |
| 2 218 678 | 11/1989 | United Kingdom | 280/507 |
| 2 255 538 | 11/1992 | United Kingdom | 280/507 |
| 94/29131 | 12/1994 | WIPO | 280/507 |

*Primary Examiner*—Kevin Hurley
*Attorney, Agent, or Firm*—Walter Unterberg

[57] ABSTRACT

A protective encasement for a vehicular trailer coupler of the latching lever towball and tongue type, completely covering the top land sides of the coupler. The encasement is made of strong thick-walled material such as but not limited to thermoplastic alloy molding and is secured to the coupler by a removable customized internal shackle through the latch lever lockhole. The shackle ends are locked into a completely encapsulated lockbody. When locked, the encasement outer wall is continuous except for the recessed lock keyhole and the flush shackle grip. This encasement provides protection for attached and unattached trailers, strongly resists tampering, is impervious to the weather, protects individuals against injuries from protrusions on the coupler, safeguards the trailer from accidental uncoupling, can be produced in bright external colors for highly visible identification, and requires no coupler or vehicle modification.

11 Claims, 5 Drawing Sheets

PROTECTIVE ENCASEMENT FOR TRAILER COUPLERS

CROSS-REFERENCES TO RELATED APPLICATIONS

This is a continuation-in-part of application Ser. No. 08/248,312, filed 24 May 1994 now abandoned.

BACKGROUND OF THE INVENTION

1. Field of the Invention

This invention relates to couplers which attach trailers to towing vehicles. Specifically, it relates to security devices which protect couplers from outside interference by humans and deterioration by the elements.

2. Description of Related Art

Trailer couplers generally are designed to attach a tongue projecting from the trailer to a tow ball secured to the rear of the towing vehicle. Commonly, the couplers are not provided with locks to prevent unauthorized opening of couplers and removal or theft of trailers. Padlocks and a number of special locks have been devised to lock couplers.

The Masterlock Company manufactures a "Trail Lock", a complex clamp, which, however, secures the trailer only when it is detached from the tow ball. This is to prevent unauthorized attachment of the trailer to a towing vehicle, but does not prevent detachment of an attached trailer from a vehicle. Sledge hammers and related tools can manipulate or destroy this lock. Also, the trailer latch remains exposed and can cause injury to an individual's knee or shin.

Fulton Performance Products manufacture a similar lock called "Gorilla Guard" which has the same drawbacks as the "Trail Lock", with the additional problem that the keyhole of the lock faces downward and could be damaged and rendered inoperative if the trailer tongue hits a hard ground surface.

The Masterlock Company also produces the "Armorlock" which is basically a padlock which slips through the latch lock hole of the coupler. This lock is designed to protect the trailer both when unattached or attached to a vehicle, but it can still be cut in two by a hacksaw or bolt cutters. Here, too, the trailer latch is exposed and capable of injuring an individual's knee or shin.

A search of the U.S. patent literature revealed a number of locks for trailers and couplers. Ponder (U.S. Pat. No. 4,730,841) shows a coupler of hinged construction with a partially protected padlock. This device is designed to protect only a detached trailer. The latch mechanism is not protected from the elements, and its exposed position could cause bodily injuries.

Callison (U.S. Pat. No. 4,774,823) deals with a conventional tongue and ball coupler, again with a partially protected and external padlock. Some modification to trailer tongue or coupler is needed, and the cover guard may need to be re-contoured to fit certain couplers. Further, the latch mechanism is not protected from the elements and its exposed position could cause bodily injuries.

Kolbusz et al (U.S. Pat. No. 5,000,067) show a U-shaped member with a threaded locking bar with a cylindrical lock for the case of a two-piece trailer hitch. This only protects the vehicle side of the tow ball.

Dolan et al (U.S. Pat. No. 5,154,440) deal with a tongue and ball coupler using a handwheel to force the ball firmly into the socket. They use a padlock to lock a retaining shelf over or adjacent to the handwheel to prevent accidental or unauthorized rotation of the handwheel. The padlock is completely exposed and some modification to the trailer is required.

Nee et al (U.S. Pat. No. 5,195,339) surround a ball and tongue coupler with a peripheral flange and a projection element locked in place by a shackle and padlock. Only detached trailers are protected, but not the latch mechanism of the coupler.

O'Neal (U.S. Pat. No. 5,222,755) deals with the problem of preventing an unattached trailer from being attached to an unauthorized towing vehicle. The socket of the coupler houses a free ball connected by a chain to a padlock secured to the locking hole in the latch lever. Here security is poor since the chain is exposed and may be cut and the lock mechanism is unprotected.

The related art described above suffers from a number of disadvantages:

Padlocks and other locking devices are either exposed or only partially concealed, allowing access to lock-breaking tools.

Some security devices are designed to protect only an unattached trailer, others only protect trailers attached to a towing vehicle from being detached.

None of these devices have Safety features which prevent injuries to individuals' knees and shins from exposed trailer couplers.

The visibility of these trailer security devices is poor; one cannot easily ascertain, from a distance whether a security device is in place on a trailer coupler.

The couplers and security devices are exposed to the elements; when trailers are stored outside for long periods of time in wet weather, precipitation can cause corrosion and deterioration of metal components.

OBJECTS OF THE INVENTION

Then objects of this invention are to overcome the stated disadvantages of the related art by providing a protective encasement for trailer couplers with the following features:

protection for attached and unattached trailers;

a coupler protection system able to defeat tampering devices by encapsulating an included lock body;

protection of the coupler against the elements which could cause material corrosion and deterioration;

protection of individuals from injuries due to exposed sharp edges and protrusions of the coupler;

a safeguard against accidental uncoupling of the trailer;

straightforward attachment to off-shelf couplers of the tongue and towball latch type without coupler modification; and highly visible identification at a distance by bright colors or patterns on the encasement exterior.

SUMMARY OF THE INVENTION

To implement the stated objects and features of the invention, a Protective Encasement for Trailer Couplers has been devised. The central feature of this encasement is an outer housing which, analogous to a helmet, covers the top and all four sides of the trailer coupler. This outer housing is thick-walled, has high impact resistance over a wide temperature range and may be made of a moldable alloy.

The outer housing encapsulates a lock body of the padlock type in its interior next to one longitudinal wall with only a small hole for access to the keyhole of the lock body.

The opposite end of the lock body houses locking holes adapted to lockably retain the prongs of a customized shackle inserted through a second small opening in the opposite longitudinal wall. The shackle is designed to be sufficiently long for the prongs to be locked into the locking holes of the lock body when the external grip of the shackle is designed to come to rest flush with the outer housing exterior, covering the shackle opening. This provides an additional safeguard against tampering with shackle or lock.

The entire protective encasement thus consists of three basic components: the outer housing, the lock body concealed within the outer housing, and the customized locking shackle which is removable. The exterior of the encasement max be painted a bright color for highly visible identification at a distance, or the color may be molded into the alloy.

In practice, a fourth component in the form of an inner lock support attached to the interior of the outer housing may be used to provide a contoured retainer precisely encapsulating the lock body and bracing the interior of the outer housing. The inner lock support can also accommodate a shackle rejection spring adapted to expel the shackle when the key is turned in the lock body to unlock the shackle.

When the encasement is installed over a trailer coupler of the towball and tongue type having a latch lever with a lock hole, the latch lever protrudes into the outer housing so that during insertion of the shackle a prong of the shackle passes through the lock hole in the latch lever, thus locking the protective encasement onto the trailer coupler.

In this way the coupler is protected whether the trailer is attached to a tow vehicle or unattached. The encasement is designed to fit off-shelf trailer couplers so that these do not require any modification. This means that the encasement can be transferred to couplers attached to different trailers. The principle of the encapsulated lock can be applied to protect trailer couplers of different design, such as but not limited to couplers with a handwheel ball tightener.

All the features cited in the Objects of the Invention are provided in this invention. There is a safeguard against accidental uncoupling of a trailer and the helmet-like exterior of the encasement protects against the elements and injuries to individuals.

BRIEF DESCRIPTION OF THE DRAWINGS

A better understanding of the invention may be gained by reference to the following Detailed Description in conjunction with the drawings provided in which.

DETAILED DESCRIPTION OF THE PREFERRED EMBODIMENTS

Figure 1:
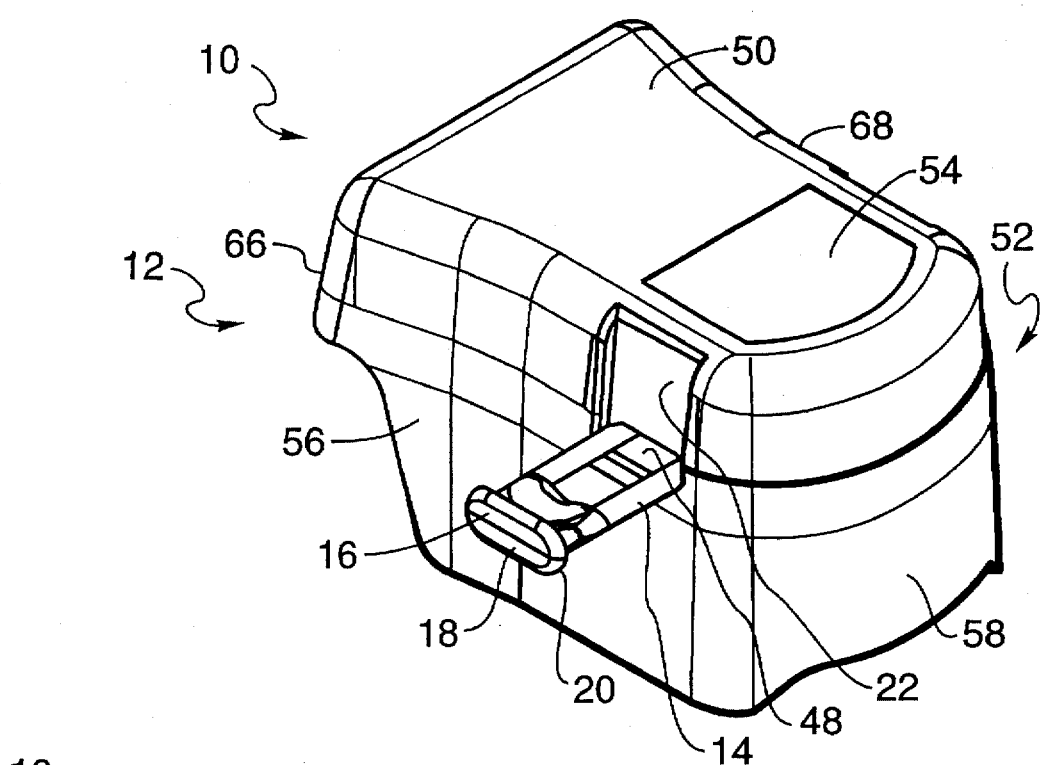
FIG. 1 is a pictorial external view from above of the assembled protective encasement in the unlocked position.

Referring to FIG. 1, the exterior of the protective encasement for trailer couplers 10 is shown pictorially in the unlocked position as viewed from above. The exterior of outer housing 12 of encasement 10 comprises a basically horizontal upper face 50 joined to a basically vertical peripheral skirt 52. Housing 12 is thick-walled throughout for high impact resistance over a large temperature range, and made of but not limited to a strong material such as steel, a suitable metal alloy, or a moulded alloy. Upper face 50 contains a depression 54 to which can be affixed a decal or other two-dimensional insignia.

Figure 7:
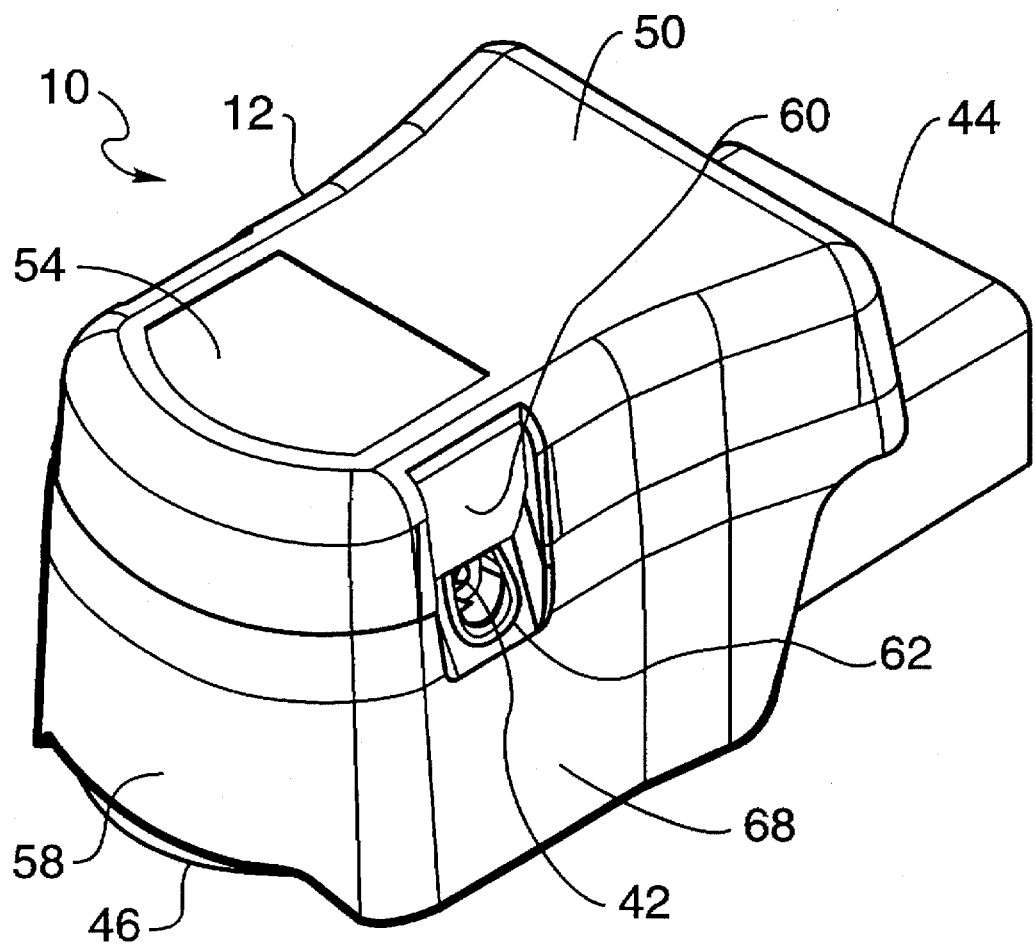
FIG. 7 is a pictorial external view from above of the assembled protective encasement installed on a trailer coupler.

The exterior of skirt 52 comprises two opposite longitudinal walls 56 and 68 connected by a side wall 58 facing the towing vehicle and a side wall 66 facing the trailer. The exterior of outer housing 12 is completely continuous except for a recess 22 and shackle opening 48 located in longitudinal wall 56, and, as shown in FIG. 7, a corresponding recess 60 and keyhole opening 62 in the opposite longitudinal wall 68.

Figure 3:
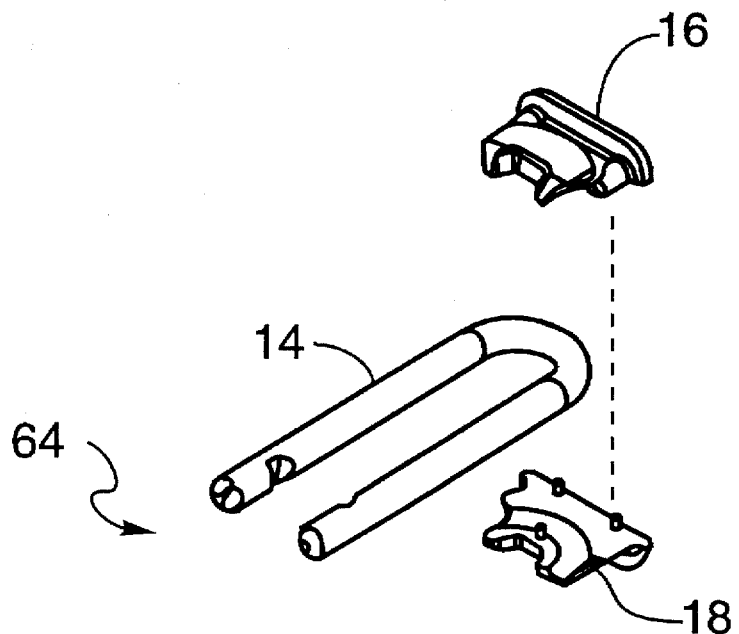
FIG. 3 is an exploded view of the shackle assembly.

Shackle opening 48 accommodates the insertion of shackle assembly 64 which is made up of components shown in the exploded view of FIG. 3. The main component is a U-shaped shackle 14 made of high-quality heat treatment-hardened plated steel. Attached to shackle 14 at the U-bend are upper shackle cap 16 and lower shackle cap 18 which mate to form a grip with peripheral lip 20 for pushing shackle 14 into the locked position, and for pulling shackle 14, when unlocked, out of encasement 10. Caps 16 and 18 are made of the same material as outer housing 12, and may be formed as a single molding.

Figure 2:
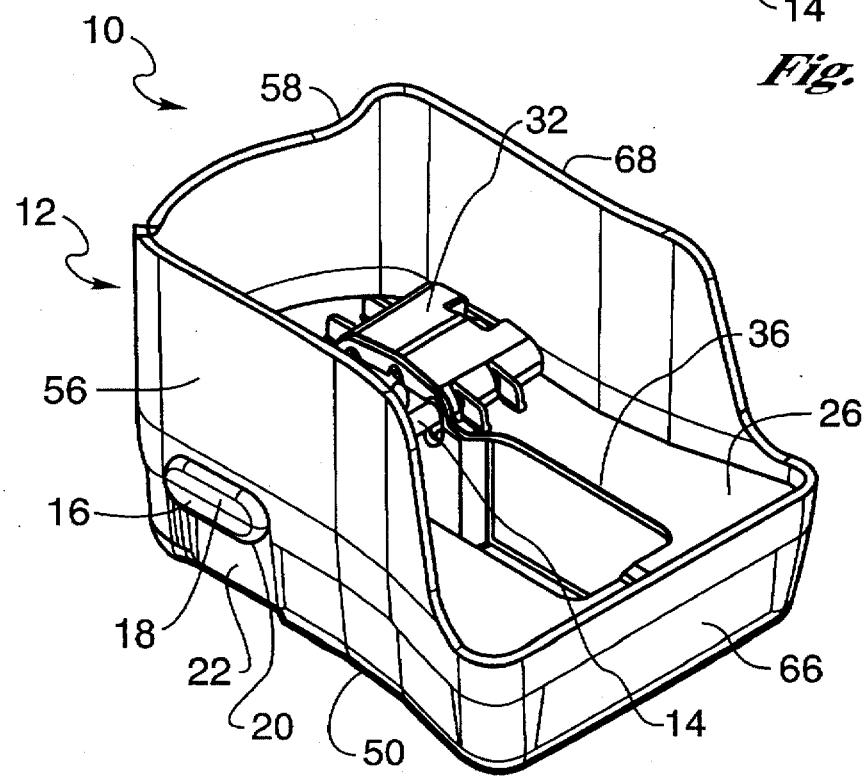
FIG. 2 is a pictorial bottom view of the assembled protective encasement, in the locked position.

Referring now to FIG. 2, protective encasement 10 is shown in the locked position with inner lock support 26, comprising lower lock enclosure 32, assembled to outer housing 12, in a pictorial bottom (or upside down) view. Longitudinal walls 56 and 68 are contoured (also shown in FIG. 1) to admit the coupler components on the trailer side and are joined by side wall 66 which faces the trailer.

In the locked position shackle assembly 64, shown in FIG. 3, is pushed into the outer housing until upper shackle cap 16 and lower shackle cap 18 are flush with longitudinal wall 56, shackle 14 being so dimensioned that at this point it is locked in a commercially available lock body 40 (see FIG. 5) which is confined in a suitably sized cavity formed by the assembly of inner lock support 26 in outer housing 12. In FIG. 2 only lower lock enclosure 32 which forms the bottom of the cavity is visible. Shackle 14 can be freed by unlocking lockbody 40 by a key introduced into recessed keyhole 42 (see FIG. 6) through keyhole opening 62 (see FIG. 5) in outer wall 68. With this construction, lockbody 40 is completely concealed except for access to its keyhole.

Figure 4:
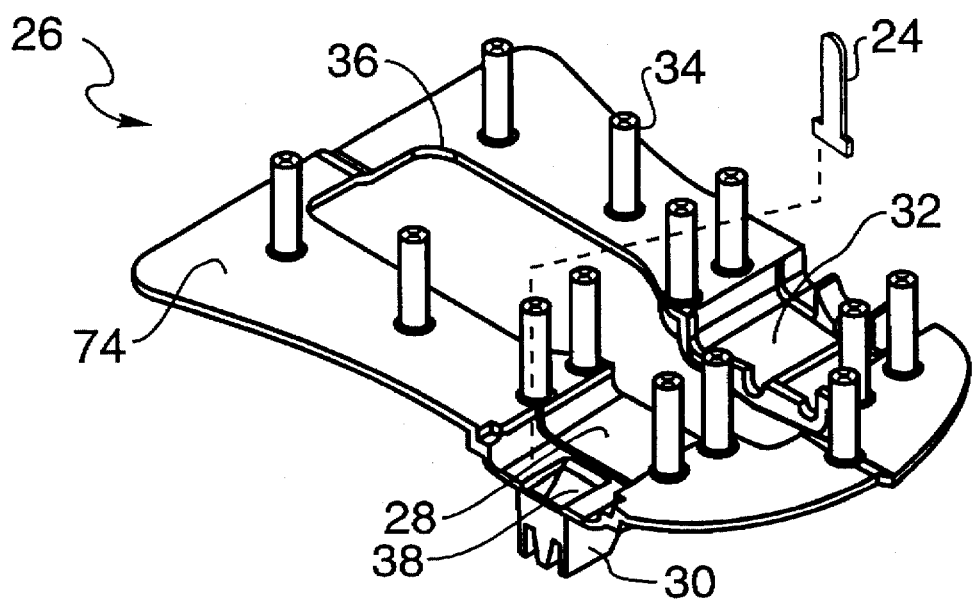
FIG. 4 is a pictorial view from above of the inner lock support.

Referring now to FIG. 4, the inner lock support 26 is shown pictorially from above. The function of this component, when assembled into outer housing 12 from below (see FIG. 5), is to define the bottom surfaces of a cavity extending from wall 56 to wall 68 (see FIG. 2) to accommodate shackle assembly 64 (see FIG. 3) and lock body 40 (see FIG. 5).

Figure 5:
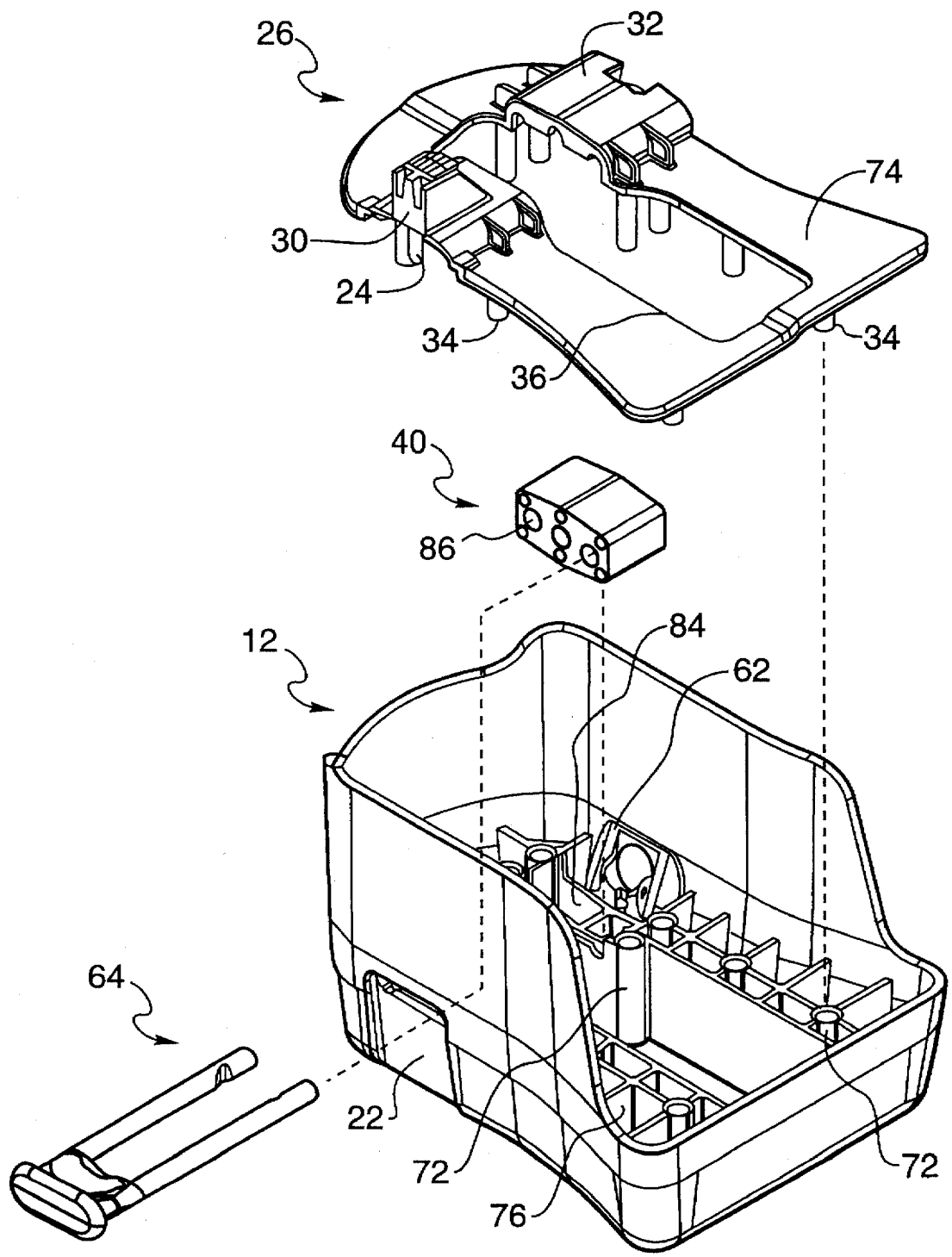
FIG. 5 is an exploded bottom view of the assembled protective encasement showing the inner lock support, lock body, shackle assembly and outer housing.

A plurality of locating pins 34, matching hollow cylinders 72 in outer body 12, as shown in FIG. 5, protrude from the mainly horizontal plate 74 of support 26. The periphery of plate 74 matches that of the interior periphery of outer housing 12 for a snug fit on assembly. A cutout 36 in plate 74 accommodates the upward protruding coupler latch mechanism when encasement 10 is installed on a trailer coupler.

The trough-shaped shackle guide 28 is lined up with shackle opening 48 in outer housing 12 (see FIG. 1) when assembled. To the left of guide 28 there is located a spring tower 30 containing a curved ramp 38 into which is inserted a shackle ejection spring 24, typically a leaf spring which protrudes into shackle guide 28. When shackle assembly 64 (see FIG. 3) is pushed into the locked position, as shown in FIG. 2, it deforms the spring into a flexed position to store the energy needed for later ejecting shackle assembly 64 (see FIG. 3) when unlocked, to a position shown in FIG. 1. Spring 24 is sufficiently thick to store the required shackle ejection energy and is made of but not limited to a non-corrosive material such as stainless steel.

Lower lock enclosure 32 is trough-shaped and dimensioned to accept lock body 40 (see FIG. 5) with a precise fit, and is lined up with shackle guide 28 so that lock body 40 can receive and lock both prongs of shackle assembly 64 (see FIG. 5).

Referring new to FIG. 5, an exploded bottom view of the completely assembled protective encasement is shown. The four main components constituting the encasement are outer housing 12, inner lock support 26, lock body 40, and shackle assembly 64.

Outer housing 12 is provided with a plurality of internal strengthening ribs 76 integral with a plurality of hollow cylinders 72 designed to receive locating pins 34 protruding from inner lock support 26. Also shown in the interior of outer housing 12 is a portion of internal open channel 84 which accepts lock body 40. Clearly shown on support 26 are spring tower 30, undeformed ejection spring 24 and the outer surface of lower lock enclosure 32. Locking holes 86 are seen in lock body 40 on the side remote from the keyhole.

Figure 6:
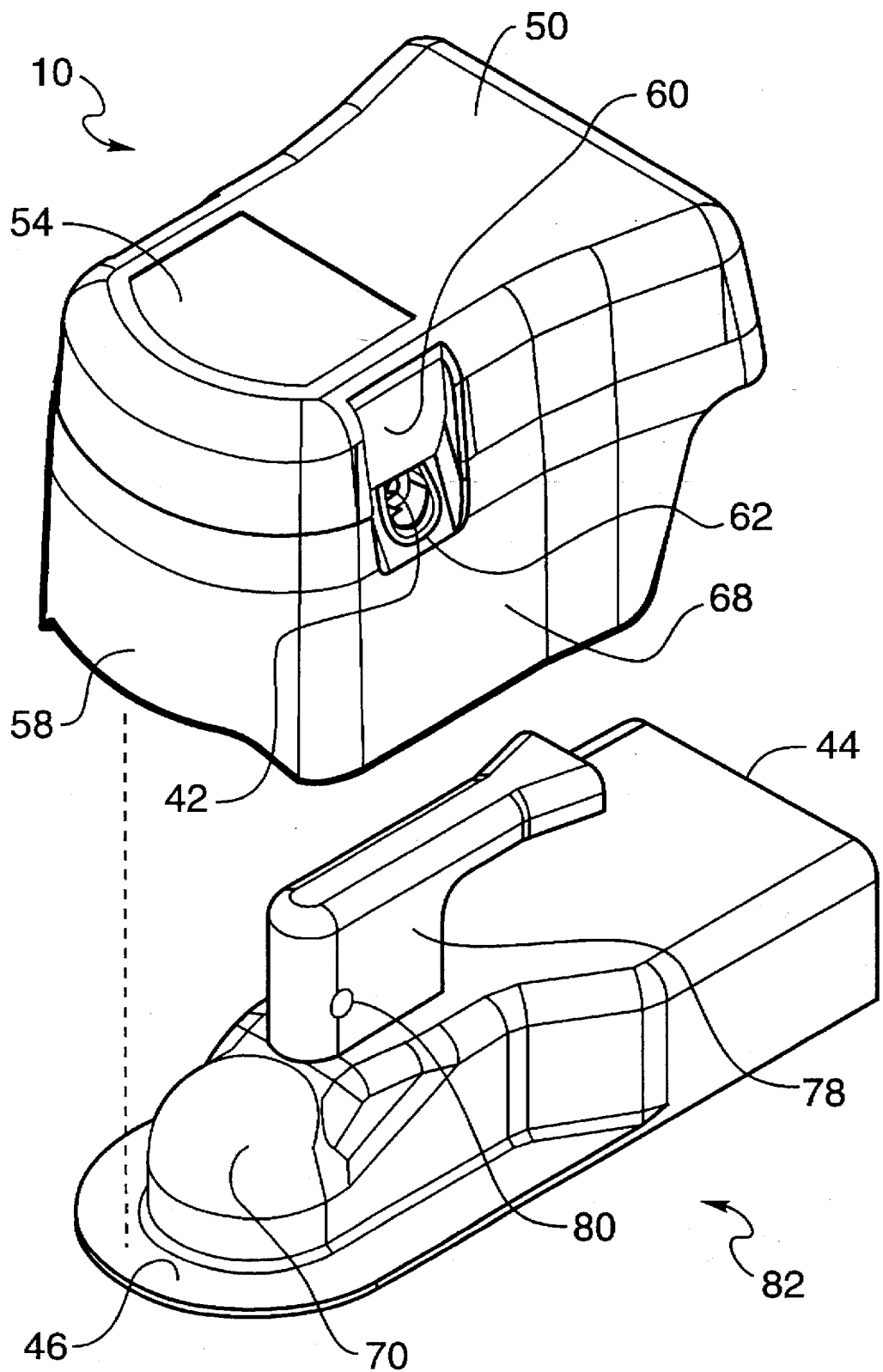
FIG. 6 is an exploded view of the installation of the assembled protective encasement on a trailer coupler.

Referring now to FIG. 6, an exploded view from above of the installation of the protective encasement on a trailer coupler is shown. The coupler 82 is of the tongue and tow ball type, with: latch lever 78 comprising lock hole 80 through which passes one of the prongs of locking shackle 14 (see FIG. 3); coupler housing 44 which receives the trailer tongue; ball socket 70 which receives the tow ball from the towing vehicle; and coupler ledge 46 which abuts encasement side wall 58 facing the towing vehicle.

Referring now to FIG. 7, there is shown a pictorial view from above of the protective encasement installed on the trailer coupler of FIG. 6. Keyhole opening 62, keyhole 42, and recess 60 which is flush with opening 62, are visible on longitudinal wall 68. The coupler is practically completely enclosed except for protruding coupler housing 44 on the trailer side, and coupler ledge 46 abutting side wall 58 on the towing vehicle side. Connections to the vehicle tow ball at ledge 46 and to the trailer tongue at coupler housing 44 are not shown.

Assembly and Installation

The protective encasement is assembled from four main components as illustrated in FIG. 5 and discussed above. The detailed steps are as follows. First, spring 24 is inserted into spring tower 30 of inner lock support 26. Then lock body 40 is placed with keyhole 42 facing out into lower lock enclosure 32 of support 26. Next, support 26 is affixed to outer housing 12 by engaging locating pins 34 in support 26 with hollow cylinders 72 in outer housing 12. In this way, lock body 40 is encapsulated, with only the keyhole exposed. Lastly, shackle assembly 64 is assembled as indicated in FIG. 3, ready for insertion into shackle opening 48 (see FIG. 1).

The installation of the protective encasement on a trailer coupler is illustrated in FIG. 6 and FIG. 7. The detailed steps are as follows. Encasement 10 is placed over the trailer coupler, with side wall 58 aligned to abut coupler ledge 46. Then lock hole 80 on coupler lever 78 is visually aligned with shackle guide 28. Lastly, shackle assembly 64 is inserted through shackle opening 48 with one shackle prong sliding through lock hole 80 until shackle caps 16 and 18 contact recess 22 which will coincide with an audible click in lock body 40 to signal that shackle 14 is lockably retained in lock body 40.

To remove protective encasement 10 from the trailer coupler, the lock key is inserted through keyhole opening 62 into keyhole 42 of lock body 40 and turned to unlock shackle 14. Flexed ejection spring 24 is now free to releases its stored energy as it returns to its undeformed state to eject shackle assembly 64 to a position similar to that shown in FIG. 1. Shackle assembly 64 can now be grasped by caps 16 and 18 and fully removed from encasement 10.

Summary

The instant invention of a protective encasement for trailer couplers has been described for the case of couplers of the tongue and tow ball latch-type. The outer housing provides an overall sturdy continuous cornerless cover of the coupler on top and sides. This design provides complete protection of couplers against the elements and has no sharp edges or protrusions which could injure legs and knees of individuals.

For easy identification the outer housing may be painted in highly visible or luminescent colors, or these colors may be molded into the housing material. This has the advantage that the operator can see if protection is in place, as can a potential burglar who will realize that demolition of such an encasement is a major undertaking and also will not want to be seen near such a highly visible object.

This device extends protection to attached and unattached trailers, the difference being the presence or absence of the vehicular tow ball. In the locked position the grip end of the customized shackle is flush with the outer housing, and the lock body is completely encapsulated; these factors make it extremely difficult to break into the lock or shackle. Since the shackle goes through the lock hole of the trailer latching lever, accidental uncoupling of an attached trailer is virtually eliminated.

Although the description above relates to a protective encasement for a tongue and towball latch-type trailer coupler, other embodiments of the invention are possible. For instance, an encasement with the features of the instant invention can be provided for couplers with a handwheel ball tightener as opposed to a latching lever system. The geometry of the outer housing of the encasement can vary to accommodate the coupler design and shape. Also, the shackle and lock cavity can assume various shapes for different kinds of lock bodies and shackles.

These and other realizations of the present invention are possible without departing from the spirit and scope of the invention as delineated in the appended claims.

We claim:

1. A protective encasement for a vehicular trailer coupler comprising a coupler latch lever, a socket for receiving a vehicle towball and a housing for receiving a trailer tongue, said protective encasement comprising:

(a) an outer housing for covering the top and sides of said vehicular trailer coupler, said outer housing being peripherally continuous and comprising a shackle opening, a keyhole opening, an internal open channel connecting the shackle opening to the keyhole opening, and a first attachment means;

(b) a lock body located in the internal open channel with its keyhole adjacent to the keyhole opening in the outer housing and having locking holes facing the shackle opening in the outer housing;

(c) an inner lock support attached to the interior of the outer housing parallel to and adjacent to the internal open channel and comprising a shackle guide in series with a lower lock support contoured for fully encapsulating the lock body located in the internal open channel, said inner lock support being formed with a second attachment means designed to engage said first attachment means in the outer housing to produce a secure attachment; and (d) a shackle assembly comprising a grip and shackle prongs to be inserted through the shackle opening into the outer housing and through the shackle guide of the attached inner lock support, the shackle prongs during insertion being adapted to lockably pass through openings in a portion of the trailer coupler protruding into the interior of the outer housing and at complete insertion to enter the locking holes in the lock body for locking the protective encasement onto the trailer coupler, at which point the shackle grip comes to rest flush against the exterior of the outer housing;

whereby said vehicular trailer coupler is protectable whether a trailer is attached or unattached to a tow vehicle.

2. The protective encasement of claim 1 wherein the outer housing is constructed of a moldable alloy with molded-in bright color patterns for highly visible identification of the protective encasement at a distance.

3. The protective encasement of claim 1 wherein the inner lock support further comprises a spring tower with a curved ramp housing a shackle ejection spring which in the undeformed state extends into the shackle guide and is deformed by the shackle assembly during insertion for locking the encasement onto the trailer coupler using the lock body, said spring after unlocking of the lock body being free to regain its undeformed state and thereby to positively eject the shackle assembly away from the lock body through the shackle guide back toward the shackle opening.

4. The protective encasement of claim 1 wherein the first attachment means in the outer body is a plurality of hollow cylinders integrated with a plurality of strengthening ribs, and the second attachment means in the inner lock support is a plurality of locating pins which engage the hollow cylinders to form a secure attachment of the inner lock support to the outer housing.

5. The protective encasement of claim 1 wherein the shackle assembly grip comprises an upper shackle cap and a lower shackle cap which mate to form a shackle grip with a peripheral lip.

6. The protective encasement of claim 1 wherein the lock body is of the padlock type.

7. A protective encasement for a vehicular trailer coupler comprising a coupler latch lever, a socket for receiving a vehicle towball, a housing for receiving a trailer tongue and a latch lever type closure, said protective encasement comprising:

(a) an outer housing for covering the top and sides of said vehicular trailer coupler, said outer housing, made of a moldable alloy with bright color patterns for high visibility, being peripherally continuous and comprising a shackle opening, a keyhole opening, an internal open channel connecting the shackle opening to the keyhole opening, and a first attachment means;

(b) a lock body located in the internal open channel with its keyhole adjacent to the keyhole opening in the outer housing and having locking holes facing the shackle opening in the outer housing;

(c) an inner lock support attached to the interior of the outer housing parallel to and adjacent to the internal open channel, said inner lock support comprising
 (i) a shackle guide;
 (ii) a lower lock support in series with the shackle guide contoured for completely encapsulating the lock body located in the internal open channel;
 (iii) a cutout for accommodating the latch lever and lock hole of the vehicular trailer coupler; and
 (iv) a second attachment means designed to engage said first attachment means in the outer housing to produce a secure attachment; and (d) a shackle assembly comprising a grip and shackle prongs to be inserted through the shackle opening into the outer housing and through the shackle guide of the attached inner lock support, the shackle prongs during insertion being adapted to lockably pass through a lock hole in the latch lever of the trailer coupler protruding into the interior of the outer housing, and when completely inserted to enter the locking holes in the lock body for locking the protective encasement onto the vehicular trailer coupler, when the shackle grip is designed to come to rest flush with the exterior of the outer housing;

whereby said vehicular trailer coupler is protectable whether trailer is attached or unattached to a tow vehicle.

8. The protective encasement of claim 7 wherein the inner lock support further comprises a spring tower with a curved ramp housing a shackle ejection spring which in the undeformed state extends into the shackle guide and is deformed by the shackle assembly during insertion for locking the encasement onto the trailer coupler using the lock body, said spring after unlocking of the lock body being free to regain its undeformed state and thereby to positively eject the shackle assembly away from the lock body through the shackle guide back toward the shackle opening.

9. The protective encasement of claim 7 wherein the first attachment means in the outer body is a plurality of hollow cylinders integrated with a plurality of strengthening ribs, and the second attachment means in the inner lock support is a plurality of locating pins which engage the hollow cylinders to form a secure attachment of the inner lock support to the outer housing.

10. The protective encasement of claim 7 wherein the shackle assembly grip comprises an upper shackle cap and a lower shackle cap which mate to form a shackle grip with a peripheral lip.

11. The protective encasement of claim 7 wherein the lock body is of the padlock type.

* * * * *